US006727800B1

(12) United States Patent
Dutu

(10) Patent No.: US 6,727,800 B1
(45) Date of Patent: Apr. 27, 2004

(54) KEYLESS SYSTEM FOR ENTRY AND OPERATION OF A VEHICLE

(76) Inventor: Iulius Vivant Dutu, 8681 Viagiula, Boca Raton, FL (US) 33496

(*) Notice: Subject to any disclaimer, the term of this patent is extended or adjusted under 35 U.S.C. 154(b) by 77 days.

(21) Appl. No.: 09/982,056

(22) Filed: Oct. 18, 2001

Related U.S. Application Data
(60) Provisional application No. 60/245,026, filed on Nov. 1, 2000.

(51) Int. Cl.[7] ............................................... G05B 19/00
(52) U.S. Cl. ..................... 340/5.53; 340/5.6; 340/5.8; 340/5.81; 340/5.82; 340/5.83; 340/5.84; 340/426.11; 340/825.69; 307/9.1; 307/10.2; 307/10.3; 307/10.4; 123/179.1
(58) Field of Search ................................ 340/5.53, 5.6, 340/5.65, 5.66, 5.8, 5.81, 5.82, 5.83, 5.84, 426.11, 5.67, 539.1, 825.69, 825.72; 307/9.1, 10.2, 10.3, 10.4, 10.5, 10.6; 123/179.1; 361/172

(56) References Cited

U.S. PATENT DOCUMENTS

| 4,158,874 A | * | 6/1979 | Ellsberg ..................... 361/172 |
| 4,995,086 A | | 2/1991 | Lilley et al. ................. 382/124 |
| 5,337,043 A | * | 8/1994 | Gokcebay .................... 340/5.67 |
| 5,661,451 A | | 8/1997 | Pollag ........................ 340/426.36 |
| 5,719,950 A | | 2/1998 | Osten et al. ................ 382/115 |
| 5,812,067 A | | 9/1998 | Bergholz et al. ........... 340/5.52 |
| 5,835,868 A | * | 11/1998 | McElroy et al. ................ 701/2 |
| 5,903,225 A | | 5/1999 | Schmitt et al. ............. 340/5.25 |
| 5,907,286 A | | 5/1999 | Kuma .......................... 340/5.5 |
| 5,917,405 A | * | 6/1999 | Joao ....................... 340/426.17 |
| 5,982,894 A | | 11/1999 | McCalley et al. .......... 340/5.21 |
| 5,995,014 A | | 11/1999 | DiMaria ..................... 340/5.52 |
| 6,021,212 A | | 2/2000 | Ho .............................. 29/434 |
| 6,038,666 A | | 3/2000 | Hsu et al. ................... 713/186 |
| 6,078,265 A | | 6/2000 | Bonder et al. ............. 340/5.23 |
| 6,100,811 A | * | 8/2000 | Hsu et al. .................. 340/5.83 |
| 6,140,939 A | * | 10/2000 | Flick ...................... 340/825.69 |
| 6,271,745 B1 | * | 8/2001 | Anzai et al. ................ 340/5.53 |
| 6,542,076 B1 | * | 4/2003 | Joao ........................... 340/539 |

* cited by examiner

Primary Examiner—Michael Horabik
Assistant Examiner—Yves DaLencourt
(74) Attorney, Agent, or Firm—Malin, Haley & DiMaggio, P.A.

(57) ABSTRACT

Disclosed is a keyless system for operating and accessing a vehicle such as an automobile, truck, minivan, bus, airplane, train, boat, etc. Preferably, the user's fingerprint is his or her "right of passage" into the vehicle. The system includes fingerprint triggered access to the physical inside space of a vehicle and along with other commands, preferably voice activated and/or card/card reader, control the vehicle's various systems. The system is designed to perform optimally in less than perfect environmental conditions and is preferably provided with its own source of energy. The system also includes a controller and interface in communication with a fingerprint sensor.

30 Claims, 9 Drawing Sheets

FIG. 3

The AF-SI Sensor is packaged in a JEDEC-standard 68-pin PLCC (Plastic leaded Chip Carrier) format. Key dimensions in millimeters are shown in the table below the illustration.

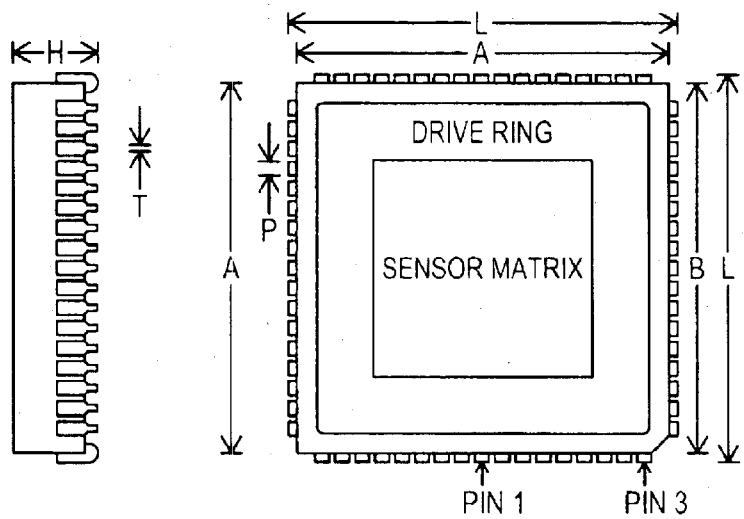

| L | | T | | A | | B | | H | P |
|---|---|---|---|---|---|---|---|---|---|
| Min | Max | Min | Max | Min | Max | Min | Max | Max | Basic |
| 25.02 | 25.27 | 0.33 | 0.53 | 24.13 | 24.33 | 24.13 | 24.33 | 3.50 | 1.27 |

All dimensions are in millimeters

Pin Assignments

| Pin | Mnemonic | Pin | Mnemonic | Pin | Mnemonic | Pin | Mnemonic |
|---|---|---|---|---|---|---|---|
| 1 | VDDD | 18 | DriveRing | 35 | DriveRing | 52 | DriveRing |
| 2 | VSSD | 19 | no connect | 36 | no connect | 53 | no connect |
| 3 | VSSA | 20 | no connect | 37 | no connect | 54 | no connect |
| 4 | VDDA | 21 | FingerPlate | 38 | FingerPlate | 55 | no connect |
| 5 | VDDD | 22 | FingerExcite | 39 | FingerExcite | 56 | no connect |
| 6 | VSSD | 23 | VSSD | 40 | VSSD | 57 | Reset |
| 7 | VSSA | 24 | VDDDon | 41 | VDDDon | 58 | Charge |
| 8 | VDDA | 25 | VDDAon | 42 | VDDAon | 59 | FingerDrive |
| 9 | no connect | 26 | VSSA | 43 | no connect | 60 | VDDAon |

FIG. 4

PARALLEL PORT

LIST PARTS SERIAL PORT

| NR | VALUE | DIGIKEY PART NO. | DESCRIPTION |
|---|---|---|---|
| 1 | BS1-IC BASIC | Stamp1-ND | Basic Stamp Module |
| 2 | TD62064 | TD62064AF-ND | TTL,5V CMOS Input-1 |
| 3 | PT78ST105 | 78ST105HC-ND | Integrated Switching R |
| 4 | R1;R2 18K | P18KECT-ND | |
| 5 | R3;R4 220 | P220ECT-ND | |
| 6 | C1;220uF/35V | P10296-ND | |
| 7 | RL1;RL2 | 255-1001-ND | TQ Series Telcom Rel |
| 8 | Swa | CKN9004CT-ND | Switch mom key guil |

PARALLEL PORT

| NR | VALUE | DIGIKEY PART NO. | DESCRIPTION |
|---|---|---|---|
| 1 | SOKET FUSE | WK0011-ND | SOKET PC MOUNT |
| 2 | F1(2A) | WK2057-ND | FUSE FAST ACTING |
| 3 | C1 220uF/35V | P10296-ND | |
| 4 | PT78ST105 | 78ST105HC-ND | |
| 5 | C2;100uF/10V | P10219-ND | |
| 6 | R1;330 | 330XSK-ND | |
| 7 | RL1;RL2 | 255-1001-ND | |
| 8 | LED | P377-ND | |

FIG.6/11

| NR | VALUE | DIGIKEY PART NO. | DESCRIPTION |
|---|---|---|---|
| 1 | RL1 | Z842-ND | 4Contacts 12v Manf |
| 2 | RL2 | Z744-ND | Power Relay |

FIG. 9

KEYLESS SYSTEM FOR ENTRY AND OPERATION OF A VEHICLE

This application claims the benefit of and priority to U.S. application Ser. No. 60/245,026, filed Nov. 1, 2000.

BACKGROUND OF THE INVENTION

1. Field of the Invention

The present invention relates generally to the operation of vehicles and particularly to the keyless system for operation and entry of a vehicle.

2. Description of Related Art

Approximately, ten to fifteen years ago, several different keys were required to gain access to the different systems of a car: (1) one for entering the car, (2) one for the gas tank, and (3) one for the trunk. Eventually, the three keys were replaced by only one for all three functions. The function of the key was further reduced by allowing the trunk and gas tank to be opened from the inside of the car either mechanically or electrically. Currently, the elimination of key functions have advanced for some cars by permitting entry (i.e. unlocking the doors) into the car by the use of a code or remote control. However, there is still a need in the art for a vehicle which is operated entirely without a key. It is to this effective resolution that the present invention is directed.

BRIEF SUMMARY OF THE INVENTION

The present invention discloses a keyless system for operating and accessing a vehicle. In the preferred embodiment the user's fingerprint is his or her "right of passage" into the vehicle. In the preferred embodiment the system includes fingerprint triggered access to the physical inside space of a vehicle and along with other commands, preferably voice activated, control the vehicle's various systems.

The present invention system is designed to perform optimally (or at least without creating any problems) in less than perfect environmental conditions, such as mechanical vibrations, temperature variations, humidity, radio wave interferences. Preferably, the system is provided with its own source of energy.

It is an object of the present invention to provide a keyless system for operating and accessing a vehicle.

It is another object of the present invention to provide a keyless system for operating and accessing a vehicle using a fingerprint sensor, card/card reader and/or voice command technology.

It is still another object of the present invention to provide an interface which communicates with the various operation of the vehicle based on communications received from a fingerprint sensor, card/card reader and/or voice command system.

It is yet another object of the present invention to provide a system for operating and accessing a vehicle which does not require the operator to carry his or her vehicle or house keys, nor remember password (s) and/or code(s).

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 3 is a computer screen illustrating the various adjustable engineering characteristics for the fingerprint sensor portion of the system;

FIG. 4 are front and side illustrations of a fingerprint sensor which can be used in accordance with the present invention, along with pin assignments, though other sensors can be used and are considered within the scope of the invention;

FIG. 9 is a part list for the interface portion of the present invention system.

DETAILED DESCRIPTION OF THE INVENTION

Figure 1:
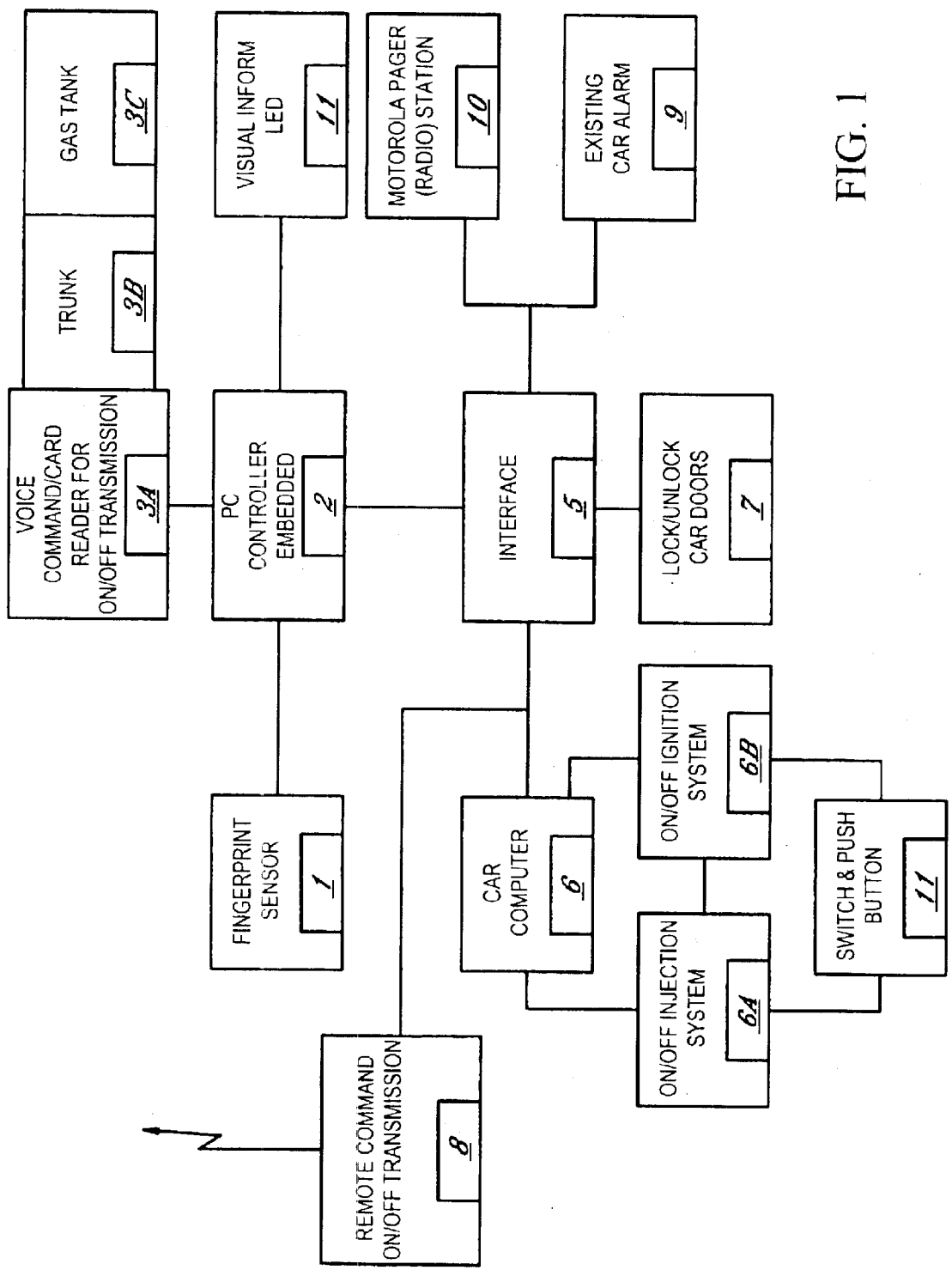
FIG. 1 is a block diagram of the preferred embodiment for the present invention.

As seen in the Figures, a keyless system for unlocking and operating a vehicle is illustrated. FIG. 1 illustrates a block diagram of the physical configuration for the preferred embodiment of the present invention.

Block 1 illustrates an Integrated circuit fingerprint sensor for the system (i.e. such as, though not limited to, sensors manufactured and sold by AuthenTec, Inc.) The sensor is a preferably durable, extremely reliable semiconductor device that can acquire a fingerprint image under the most rigorous real world conditions. Preferably, the sensor is enabled and performance-enhanced by advanced imaging control software. This highly adaptive software mechanism automatically manages and performance-tunes the image detection and acquisition process. Using Direct Digital Synthesis, an external source provides signal to the drive ring. Each element in the sensor matrix is provided with an under-pixel amplifier, a synchronous demodulator, and a spatial filter node. Each sensor row uses a multiplex to combine the output of all elements into a single signal. When a finger is placed on the sensor matrix, a very small signal is coupled from the drive ring to the sub dermal layer of the skin (See FIG. 4 for Sensor Matrix and Drive Ring). This signal follows the ridges and the valleys of the true fingerprint image. A fingerprint image is scanned by digitizing the outputs from one sensor row at a time in an image, power is applied to the selected row, enabling the row to drive an analog channel bus. The sample and hold outputs are digitized and sent serially via the host interface to the True Print imaging processing algorithm.

Other means for authenticating permitting access, such as picture, voice, image, DNA, etc., can be used in lieu of the fingerprint sensor and are considered within the scope of the invention. Additionally, various types of sensors, including fingerprint sensors, can be used and are also considered within the scope of the invention.

Block 2 illustrates the PC Controller for the system. In one embodiment the controller can be a single board computer and/or an embedded system, though such is not limiting. The PC Controller stores the authorized voice and fingerprint information.

Figure 5:
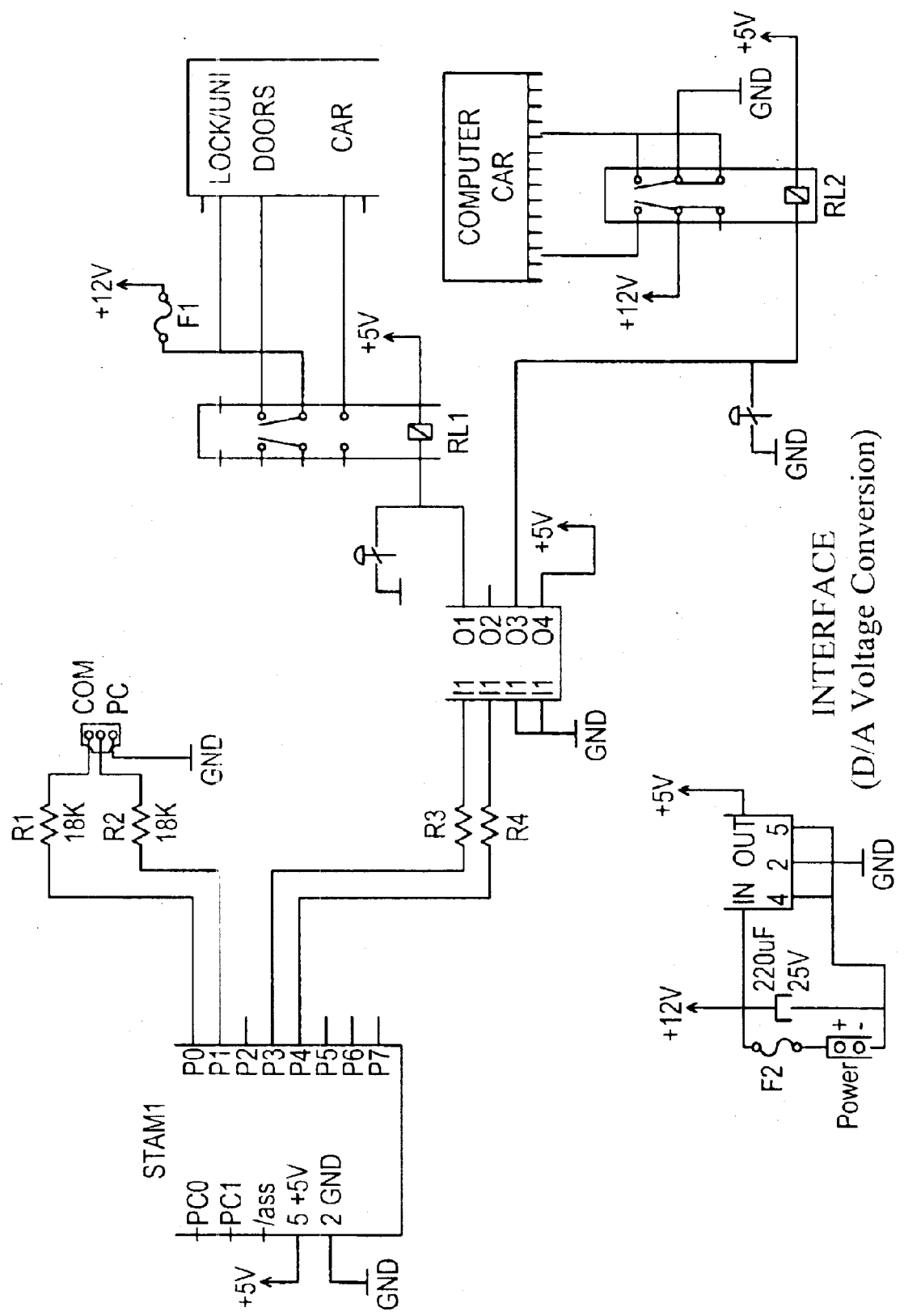
FIG. 5 is an electrical schematic for the serial port of the interface portion in accordance with the present invention.
Figure 6:
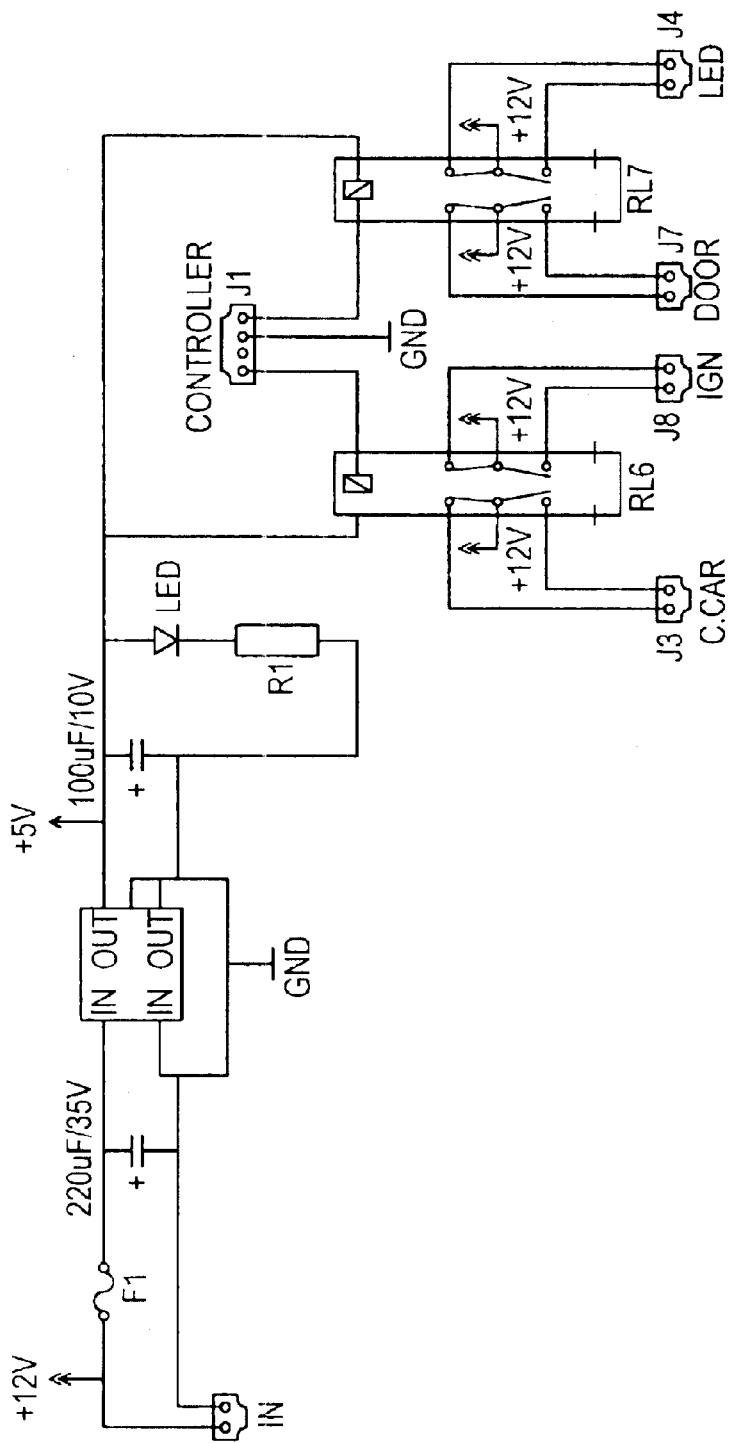
FIG. 6 is an electrical schematic for the parallel port of the interface portion in accordance with the present invention.

Block 5 illustrates the Interface component of the system. The interface is given more detailed treatment in the electrical schematics of FIG. 5 and FIG. 6. The two schematics allow the communication with the PC Controller (Block 2) on both serial and parallel ports. For the serial port, the programmed module STAMP 1 can be used to allow high speed, as well as to build a more complex application; at a time, where only two lines are used. This module can be an I/O computer, which is preferably programmed in Basic, though such is not limiting. The module has eight I/O lines of program storage and receives power from a regulated or unregulated voltage from 5–12V. The output signal is taken by a driver in Darlington configuration and sent to the relays. Those relays are preferably a family of compact and high sensitivity relays. Communication between the three elements presented is preferably accomplished as follows: the fingerprint sensor (Block 1) communicates with the PC controller (Block 2) preferably through a USB port; the PC controller (Block 2) communicates with the Interface (Block 5) preferably through a serial or a parallel port.

Block 3 (A, B, C) illustrates the Voice command components, as well as preferred uses for voice command. The authorized user's voice print and spoken commands are stored in a database. This permits only the authorized user to start or stop the transmission, through a simple voice command like: "Start Transmission" or "Stop Transmission", etc., thus offering increased protection and convenience to the vehicle's user. Alternatively, as will be discussed below, a card and card reader can be used for controlling the transmission. The voice command can also be used to open/close the gas tank and the trunk for added convenience and can also be incorporated for other uses not illustrated. The Voice Command can be programmed such that the gas tank and/or trunk will not open while the vehicle is running and/or in motion (i.e. moving). In the Voice Command's construction, an electric condenser microphone cartridge is preferably used, which can consist of a high voltage internal electric membrane, metal electrode and a Field Effect Transistor (FET). The microphone does not need a high voltage bias from the outside like conventional condenser microphones, since it has a highly efficient electrical specification, pressure type operating principle, low impedance (2,2 KOhm), omni directional back directivity, and a high degree of reliability under adverse shock and vibration. Its technical characteristics are preferably: omni directional; sensitivity: −45 dB+4 dB; S/N>62 dB; frequency: 20–20 KHz; voltage max/std 10V/2V. These specs should not be considered limiting. The coupling is realized through a relay, which in the "ON" position (corresponding with the Stop Transmission), places the transmission switch of the vehicle on Neutral.

Block 6 (A,B) illustrates the vehicle's computer which can be used in connecting/disconnecting the Injection and Ignition systems, using a multiple contacts relay.

Figure 7:
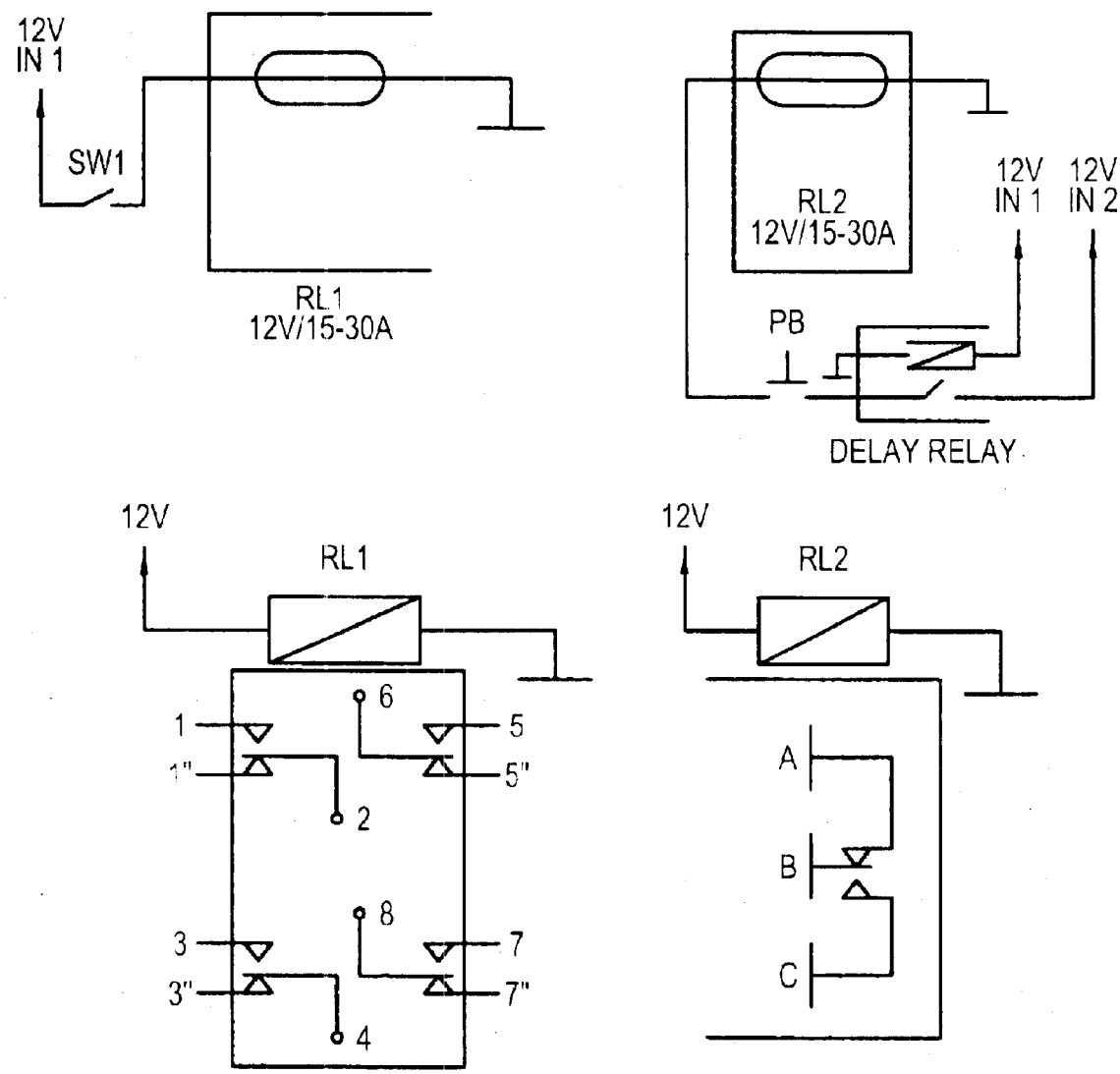
FIG. 7 is an electrical schematic of the relays in accordance with the present invention.
Figure 8:
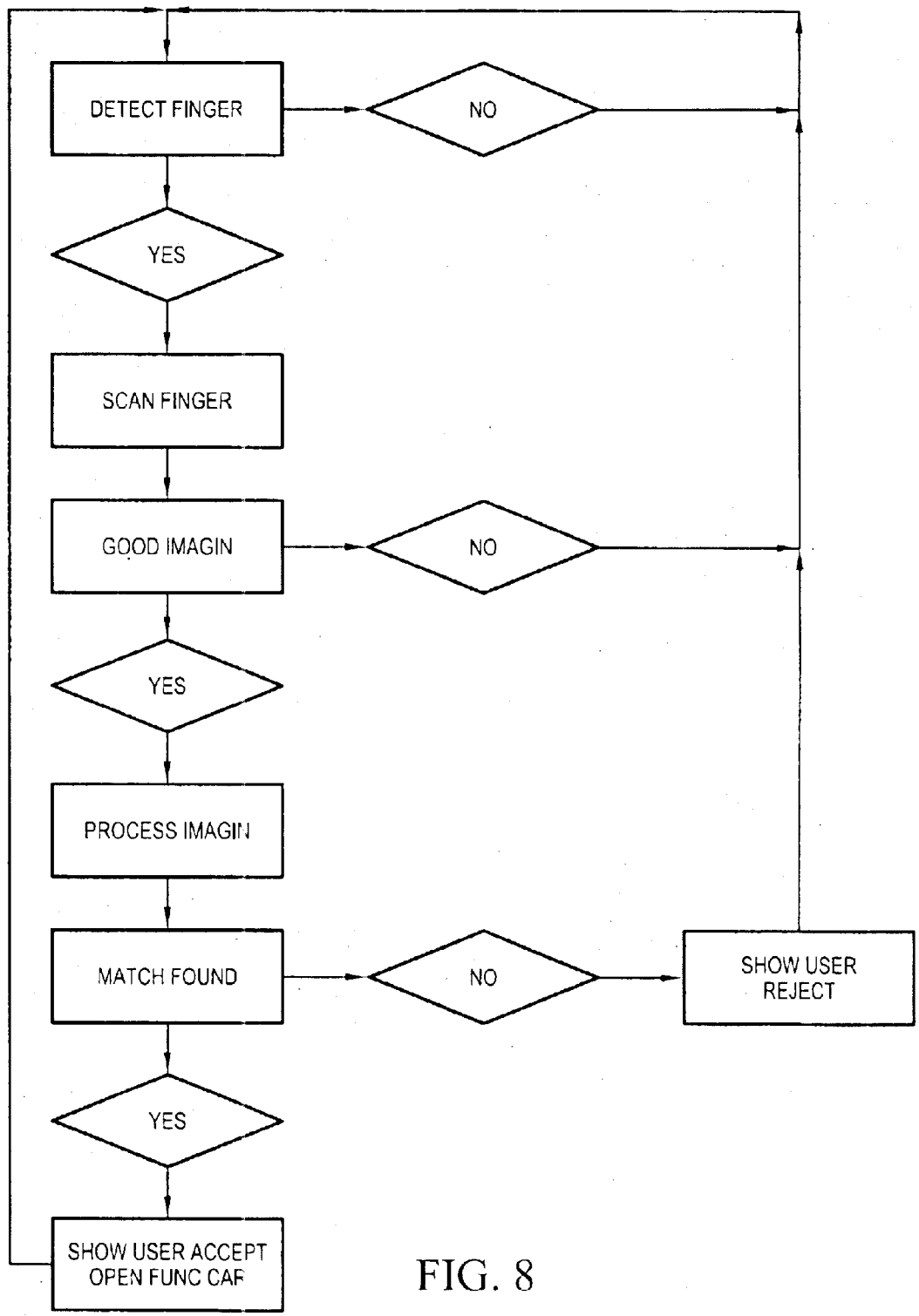
FIG. 8 is a flowchart for the software methodology of the present invention.

Block 11 illustrates the Push button and relays (on/off switch) which is connected to Block 6 (A,B) (See FIG. 1) initializes a keyless startup of the vehicle, with the two relays (See FIG. 7) and a push button of Block 11. The relays' purpose is to allow the use of a preferably small switch and push button (which implies low amperes). The relays themselves take on the higher amperes necessary for the startup. This way, simply and economically, the use of a key is replaced, as follows (see also Blocks 6 and 11 of FIG. 1, and FIG. 7:

once the system is initialized, the Interface will allow an electrical current of 12V to access IN1 and IN2. Sw1 by being in an "On" position allows the following contacts: 1-2, 3-4, 5-6, 7-8, and A-B, which mimics the key's function in its rotation up to the "Start" position. From that point, the push button takes over. When the button is pressed, the relay RL2 disconnects the contact A-B (which stands for the engine's air conditioning and ventilation) and connects the B-C contact for a few seconds, necessary to rotate the electric motor, thus starting the car. As soon as the push button is depressed, the A-B contact is again connected.

A safety feature can be added to prevent damage to the engine by the accidental or inadvertent pressing of the push button when the engine is running and/or the car has been started. Two different embodiments of the safety feature are disclosed below, though other embodiments are possible and are considered within the scope of the invention. In a first embodiment, a delay relay (FIG. 7) is provided. These relays are typically found in diesel engines due to the incandescent spark plugs and has a delay time of approximately fifteen to thirty seconds, though other times (smaller and larger) can be chosen and all are considered within the scope of the invention. With this embodiment, when switch SW1 is activated ("ON" state), the Delay Relay is also activated (shut down contact). At this point, the push button is activated and the car can be started for the time of Delay Relay (e.g. preferably fifteen to thirty seconds). After the chosen Delay Relay time has elapsed (i.e. thirty seconds), the Delay Relay disconnects the contact and thus also deactivating thus push button. Thus, if the push button is pressed it does not have any effect and does not harm the vehicle. By turning the. vehicle off (deactivating switch SW1) and then activating switch SW! again repeats the process, and allows the push button to start the vehicle during the time period determined by Delay Relay (i.e. fifteen to thirty seconds).

In another Safety embodiment, a communication relay can be used in lieu of the Delay Relay. In this embodiment, by using an electrical impulse from the RPM of the engine, once the revolution reaches 800 rotations/min (or some other set or programmed value), the communication relay can cut the voltage, and thus deactivating the push button, similar to the Delay Relay disconnecting. Prior to reaching the threshold value (i.e. 800 rotations/minute), the push button is provided with voltage and is thus activated and will start the engine. Accordingly, prior to starting the engine, when SW1 has been turned on, the RPM will be below 800 rot/min, and thus the push button is activated for starting the engine of the vehicle.

Additionally, a card reader, such as a smart card reader, can be installed within or on the vehicle and preferably, though not limited to front left side of the car window. As seen in FIG. 1, the card reader is direct communication or connection with PC controller 2. The card, preferably includes a chip including the owner's and/or other authorized user's fingerprint information. In use, the transmission is activated through the interface when the card is properly inserted within the reader. When the gear shift is in a "P" (park) position, and the card is not disposed within the card reader, the computer does not recognize the person who used it and does not allow the gear shifter or stick to be moved from the park "P" position. Once the smart card is activated by introducing the card into the reader, anybody can drive the car, until the gear stick/shifter is placed in the "park" position again, thus, requiring the smart card to be inserted. Thus, even if the vehicle is unlocked and running, it cannot be moved from the "park" position by an unauthorized individual not having the proper smart card. The smart card can be a stand alone card or can be a credit card, driver's license, identification card, etc. typically already carried by the driver in his or her wallet. Accordingly, as the transmission is controlled by the card/card reader, the steering wheel can be permitted to rotate whether or not the engine is running, and does not lock when not running.

Block 9 represents an existing car alarm. The connection to the vehicle's existing alarm system differs from one vehicle model to another, the general functioning principle is based on the ON/OFF alarm switch's connection to the Interface (Block 5). This command can be triggered or taken by the fingerprint sensor, through PC Controller 2 and interface 5. Block 7 represents the lock/unlock vehicle door command. The general LOCK/UNLOCK door switch is connected to the Interface, the command being also taken by the fingerprint sensor, similarly to that described for Block 9.

Block 10 represents a remote pager station. The typical break-in warning sensors of a vehicle's alarm system are connected to the "IN" signal of a remote pager station (Block 10), such as, but not limited to a Motorola station. Once the sensors are activated, the Motorola station will transfer from reception to transmission mode, allowing the owner's pager (on the same wavelength) to receive the warning signal.

Block 8 illustrates a remote command for turning on/off the vehicles transmission. To call the pager, a 7-digit code recognition is necessary. The "off" 7-digit code will be different from the "on" 7-digit code, thus eliminating possible errors in calling the pager. The invention is not considered limited to 7-digit codes. Other remote activation technology can also be used in replace of the preferred paging technology. All are considered within the scope of the invention.

These features provide for an alarm and security of the vehicle.

It should be apparent the internal mechanical and electrical function and structure of unlocking/locking the door, start the engine (injection and ignition), opening the gas tank and trunk, etc. remain the same. The invention merely replaces the use of a key by a keyless system to initiate these functions. The various components of the system can be connected with each other through conventional standard wiring, cables and other conventional standard structure and devices.

A two color LED assembly (i.e. green and red, though not limiting) can be directly connected and in communication with the interface to provide a visual state of the vehicle. The assembly takes the electrical signal and transforms it into a light signal. "Red" can indicate that the doors are locked, while "green" can indicate that a proper read by sensor 1 has occurred and access within the vehicle is permitted (i.e. the door has been unlocked). Other definitions for the colors, as well as other colors or more than two colors, can be used and are all considered within the scope of the invention. Furthermore, other light assemblies and other visual or audio indicators can be used in lieu of the preferred LED assembly and all are considered within the scope of the invention.

The location of sensor 1 is preferably under the driver's side mirror, though such is not considered limiting, and other areas of the vehicle can be used and are considered within the scope of the invention. When attached to the driver's side mirror, the sensor is preferably installed on the fixed part of the mirror frame or cover without affecting the movement of the mirror. The sensor can be covered and protected by a case (preferably plastic) having a movable cover to permit access to the sensor during use. The case and cover protect the sensor from direct mechanical strikes, water, snow, etc.

Though not limiting, the system preferably operates at a temperature range which is compatible to the range of the vehicle, such as but not limited to, approximately −40° Celsius to approximately +85° Celsius. Additionally, the system preferably operates between approximately 7.5 Volts to approximately 18 volts, though again such range is not considered limiting. Furthermore, the system preferably operates at a maximum of 0.8 Amps, and typically at 0.4 Amps, though again these figures are also not considered limiting.

Though preferably used with vehicles, such as automobiles, sport utility vehicles, minivans and trucks, the present invention is not limited to such. Thus, the term vehicle for purposes of the invention and claims is considered to also include, in addition to the above, airplanes, boats, buses, trains, blimps, helicopters, etc.

Functionality and Interconnections

The present invention uses the interface (Block 5) in order to open/close doors and enable/disable the car computer without using a key. The fingerprint sensor (Block 1) which reads the fingerprint, preferably authorizes all the commands, submitting them consequently to the controller PC2 (Block 2).

Once scanned and recognized (matching the data stored in the database) by the controller PC2, the fingerprint authorizes the Interface (Block 5) to communicate with the lock/unlock doors switch, permitting their locking or unlocking (Block 7).

In the meantime, the Car Computer (Block 6) receives the signal to initiate the Injection System (Block 6A) and the Ignition System (Block 6B). As soon as the System has been initialized, the car can be started without a key, with an On/Off Switch and a Push Button (Block 11).

After the authorized fingerprint accesses the Car Computer (Block 6), the engine can be started or stopped with the key if the user so desires (i.e., for valet parking).

Block 3 controls, through voice commands, the transmission's starting and stopping (either by voice command and/or card/card reader), allowing the user the possibility of leaving the vehicle with the air conditioning running without any concern that it may be taken by somebody else, since only the recorded, recognized voice can access the car's controls. In order for this group to be functional, the user's voice has to be scanned, its characteristics digitally stored for future recognition. By the same voice commands, the trunk and gas tank can also be operated, other features can also be triggered from voice command.

The Interface (Block 5) also preferably activates any alarm system originally installed on the car (i.e. locking the car with the fingerprint can also turn the alarm on). To complete the alarm system an emission/reception station (Block 10) can also be provided for sending a signal to user's pager under certain conditions. If anyone tampers with the car while the user is away from the car, the alarm goes off and sends a signal to the user's pager, letting him or her know of the situation.

A numeric pager (connected to the national paging system) can be coupled between the interface and the computer. When it is in the "off" position, the system is functioning as if there is no pager at all. When it is in the "on" position, the computer will no longer take commands from the fingerprint sensor (the interface, respectively), not allowing even the authorized user to start the vehicle. However, the system can be programmed to continue to permit the user to open/close the doors and/or arm/disarm the alarm. This feature is illustrated in Block 8 of FIG. 1.

If the car is running and it receives the signal to stop, that signal will be validated once the engine is turned off by the authorized user, and cannot be turned back "on" before the pager goes back to the "off" position.

Figure 2:
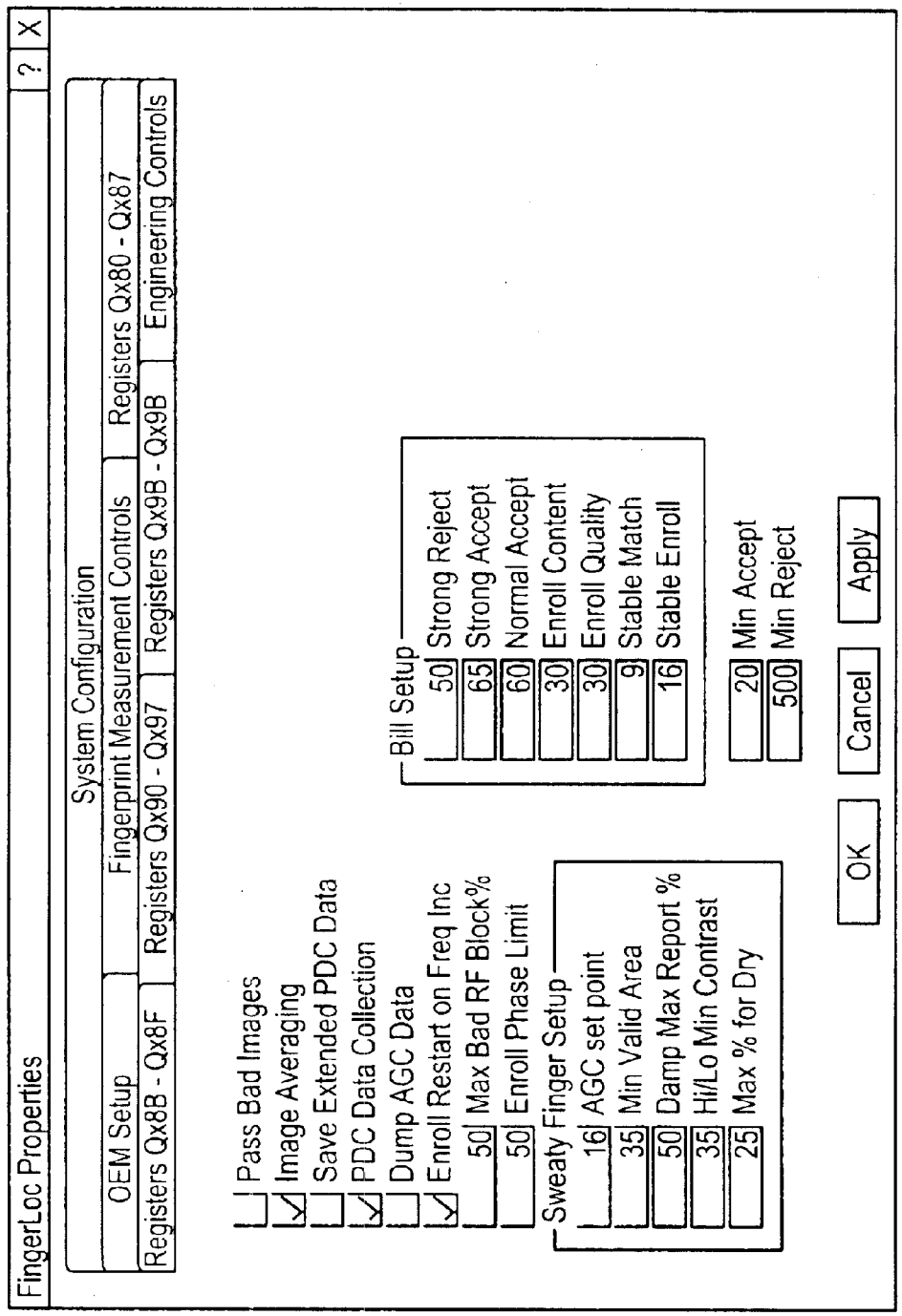
FIG. 2 is a computer screen illustrating the various adjustable parameters of operation for the fingerprint sensor portion of the system.
Figure 3:
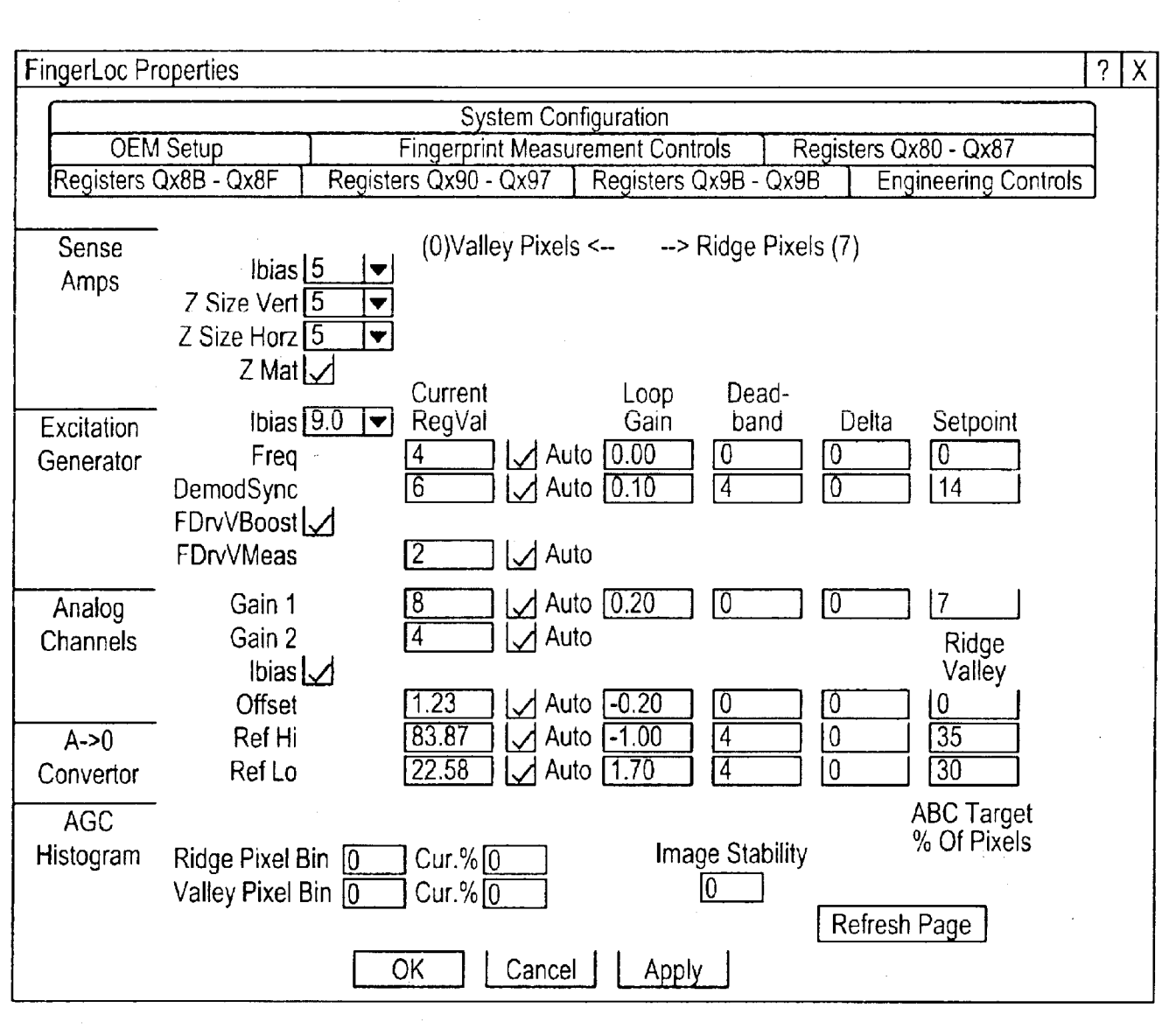

The fingerprint sensor is preferably not affected by any mechanical vibrations. Other factors (such as humidity and temperature fluctuations) which may effect its operation can be controlled by software. Internal software can also be used and programmed to control possible radio waves interference. A presentation of the settings used to control these influences as well as the sensor's characteristics appear in FIGS. 2 and 3.

All the components used to build the present invention system (Interface. 5 included) are preferably chosen to perform very well even in drastic environmental conditions.

The system can be powered by the battery of PC Controller (Block 2), which can be designed to be charged by the vehicle's alternator. The system is designed to be very flexible and to operate in very hard conditions (i.e. water and salt in a marine environment). The system also provides the vehicle with security and an alarm.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system in communication with an existing vehicle computer for keyless operation of a vehicle including entering, activating and starting of the vehicle, said system comprising:

means for authorizing a user by one or more biometric templates at a single external location on a vehicle for both keyless access within and keyless starting of the vehicle by the user;

wherein once the user has been authorized by said means for authorizing, the user can enter a previously locked vehicle and start the vehicle for driving by pressing of a push button switch assembly located within the vehicle without the necessity of a vehicle key or any other portable mechanism such as a remote transmitter.

2. A system in communication with an existing vehicle computer for keyless operation of a vehicle including entering, activating and starting of the vehicle from matching of a biometric template read at the vehicle, said system comprising:

a single fingerprint sensor externally located on the vehicle for placement of a user's finger to scan;

a controller in communication with said fingerprint sensor for authorizing the user for both access within and starting of the vehicle by matching biometric templates scanned from the user's finger placed at the externally located fingerprint sensor with stored information regarding the user;

an interface in communication with said controller and with the vehicle computer; and wherein upon authorizing the user the vehicle computer is instructed by the controller to activate an ignition system and an injection system of said vehicle without a vehicle key;

means for starting a vehicle engine without a vehicle key and without further authorization once the ignition system and the injection system have been activated.

3. The system for keyless operation of claim 2 further comprising means for controlling the transmission of the vehicle in communication with said controller.

4. The system for keyless operation of claim 2 wherein when an authorized fingerprint is read from the scan at the externally located fingerprint sensor, said controller communicates with a means for unlocking and locking one or more doors of the vehicle.

5. The system for keyless operation of claim 2 further comprising means for visually informing a user that an authorized fingerprint has been read by said fingerprint sensor, said means for visually informing located on the vehicle.

6. The system for keyless operation of claim 5 wherein said means for visually informing is a two color LED in communication with said controller; wherein when an authorized fingerprint has been read by said fingerprint sensor a signal is sent from said controller to said LED to energize said LED a specific color.

7. The system for keyless operation of claim 3 wherein said means for controlling the transmission comprises a card and card reader, said card containing authorizing data which is read by said card reader to permit a gear shifter of said vehicle to be moved from a "park" position, said card reader located within the vehicle.

8. The system for keyless operation of claim 2 further comprising means for preventing restarting of the vehicle engine once the vehicle engine has been started by said means for starting and remains running.

9. The system for keyless operation of claim 2 further comprising voice command means for controlling a gas tank assembly and a trunk assembly of the vehicle, said voice command means in communication with said controller.

10. The system for keyless operation of claim 2 further comprising means for remotely informing a user that the vehicle is being tampered with, said means for remotely informing in communication with said interface.

11. The system for keyless operation of claim 2 further comprising means for remotely controlling a transmission of the vehicle, said means for remotely controlling in communication with said interface.

12. The system for keyless operation of claim 3 wherein said means for controlling the transmission is a voice command assembly.

13. The system for keyless operation of claim 2 wherein said means for starting is a switch assembly including a push button in communication with a switch, said push button disposed at a user accessible location within the vehicle, wherein when the push button is pressed by the user a contact of the switch permits an electric motor of the vehicle to rotate to start the car without a vehicle key.

14. The system for keyless operation of claim 2 wherein the vehicle has a side mirror and the fingerprint sensor is located on a bottom surface of the side mirror.

15. A system in communication with an existing vehicle computer for keyless operation of a vehicle including entering and starting of the vehicle from matching of a biometric template read at the vehicle, said system comprising:

a single fingerprint sensor externally located on the vehicle for placement of a user's finger to scan;

a controller in communication with said fingerprint sensor for authorizing the user for both access within and starting of the vehicle by matching biometric templates scanned from the user's finger placed at the externally located fingerprint sensor with stored information regarding the user;

an interface in communication with said controller and with the vehicle computer;

wherein upon authorizing the user the vehicle computer is instructed by the controller to activate, without further authorization, an ignition system and an injection system of said vehicle without a vehicle key;

means for starting a vehicle engine without a vehicle key and without further authorization once the ignition system and the injection system have been activated; and means for controlling the transmission of the vehicle in communication with said controller;

wherein when an authorized fingerprint is read from the scan by the externally located fingerprint sensor, said controller communicates with a means for unlocking and locking one or more doors of the vehicle and activates the ignition system and injection system of the vehicle.

16. The system for keyless operation of claim 15 further comprising means for visually informing a user that an authorized fingerprint has been read by said fingerprint sensor, said means for visually informing located on the vehicle.

17. The system for keyless operation of claim 16 wherein said means for visually informing is a two color LED in communication with said controller; wherein when an authorized fingerprint has been read by said fingerprint sensor a signal is sent from said controller to said LED to energize said LED a specific color.

18. The system for keyless operation of claim 15 wherein said means for controlling the transmission comprises a card and card reader, said card containing authorizing data which is read by said card reader to permit a gear shifter of said vehicle to be moved from a "park" position, said card reader located within the vehicle.

19. The system for keyless operation of claim 15 further comprising means for preventing restarting of the vehicle engine once the vehicle engine has been started by said means for starting and remains running.

20. The system for keyless operation of claim 15 further comprising voice command means for controlling a gas tank assembly and a trunk assembly of the vehicle said voice command means in communication with said controller.

21. The system for keyless operation of claim 15 wherein said means for starting is a switch assembly including a push button in communication with a switch, said push button disposed at a user accessible location within the vehicle, wherein when the push button is pressed by the user a contact of the switch permits an electric motor of the vehicle to rotate to start the car without a vehicle key.

22. The system for keyless operation of claim 15 wherein the vehicle has a side mirror and the fingerprint sensor is located on a bottom surface of the side mirror.

23. A system for keyless operation of a vehicle, said system comprising:

a single means for obtaining biometric identification information, said means for obtaining externally located on the vehicle;

means for recognizing the identification information is for an authorized user;

means for permitting a recognized authorized user to enter, start and drive the vehicle without a vehicle key based on the biometric identification information received from said single means for obtaining.

24. A method for entering and starting a vehicle without a vehicle key, comprising:

(a) obtaining biometric information from an individual at the vehicle from a single fingerprint sensor externally located on the vehicle to determine if the individual is an authorized user for the vehicle;

(b) permitting entry into vehicle and activating an ignition system and an injection system of the vehicle without further authorization and without a vehicle key if it is determined that the individual is an authorized user from the obtained biometric information; and (c) permitting the authorized user to start an engine of the vehicle without further authorization and without a vehicle key.

25. The method of claim 24 wherein step (c) comprises the step of pressing a push button in communication with a switch which is in communication with an electric motor associated with the engine; wherein the pressing of the push button causes the electric motor to rotate to start the car.

26. The method of claim 24 wherein step (a) comprises the step of placing a finger of the individual on the externally located fingerprint sensor.

27. A system for keyless operation of a vehicle including entering and starting of the vehicle, said vehicle including an existing vehicle computer, an ignition assembly and an injection assembly, said system comprising:

means for authorizing a user by a biometric template for keyless access within and keyless starting of a vehicle by the user, said means for authorizing including a single biometric template reader located at an external location on the vehicle where the user's biometric template is read for authorization for both access within and starting of the vehicle;

wherein once the user has been authorized by said means for authorizing the user can enter a previously locked vehicle and a signal is provided to the existing vehicle computer to activate the ignition assembly and the injection assembly of the vehicle so that the user can start the vehicle for driving by pressing a push button switch assembly accessible to the user within the vehicle;

wherein unlocking of the vehicle, activating of the ignition assembly and the injection assembly and starting of the vehicle are all performed without the necessity of a vehicle key.

28. The system for keyless operation of a vehicle of claim 27 wherein said push button switch assembly includes a push button in communication with a switch, said push button disposed at a user accessible location within the vehicle, wherein when the push button is pressed by the user a contact of the switch permits an electric motor of the vehicle to rotate to start the car.

29. The system for keyless operation of a vehicle of claim 28 wherein the pressing of the push button by the user disconnects operation of an air conditioning and ventilation system of the vehicle while the push button remains depressed.

30. The system for keyless operation of a vehicle of claim 27 wherein the biometric template reader is a fingerprint sensor.

* * * * *